US010336964B2

(12) United States Patent
Imai et al.

(10) Patent No.: US 10,336,964 B2
(45) Date of Patent: Jul. 2, 2019

(54) GREASE COMPOSITION AND BEARING

(75) Inventors: Yutaka Imai, Fujisawa (JP); Yuji Onuki, Fujisawa (JP)

(73) Assignee: KYODO YUSHI CO., LTD., Fujisawa (JP)

( * ) Notice: Subject to any disclaimer, the term of this patent is extended or adjusted under 35 U.S.C. 154(b) by 0 days.

(21) Appl. No.: 13/120,234

(22) PCT Filed: Sep. 28, 2009

(86) PCT No.: PCT/JP2009/066762
§ 371 (c)(1),
(2), (4) Date: Mar. 22, 2011

(87) PCT Pub. No.: WO2010/035826
PCT Pub. Date: Apr. 1, 2010

(65) Prior Publication Data
US 2011/0183876 A1  Jul. 28, 2011

(30) Foreign Application Priority Data
Sep. 26, 2008 (JP) .................................. 2008-249048

(51) Int. Cl.
*C10M 169/06* (2006.01)
*F16C 33/66* (2006.01)

(52) U.S. Cl.
CPC ........ *C10M 169/06* (2013.01); *F16C 33/6633* (2013.01); *C10M 2205/0285* (2013.01); *C10M 2207/0406* (2013.01); *C10M 2207/1256* (2013.01); *C10M 2207/1265* (2013.01); *C10M 2215/1026* (2013.01); *C10M 2219/046* (2013.01); *C10M 2219/066* (2013.01); *C10N 2230/06* (2013.01); *C10N 2230/52* (2013.01); *C10N 2240/02* (2013.01); *C10N 2250/10* (2013.01)

(58) Field of Classification Search
CPC ........ C10M 169/06; C10M 2207/1256; C10M 2205/0285; C10M 2207/0406; C10M 2219/066; C10M 2219/046; C10M 2215/1026; C10M 2207/1265; F16C 33/6633; C10N 2240/02; C10N 2230/06; C10N 2250/10; C10N 2230/52
USPC ........................................................ 508/390
See application file for complete search history.

(56) References Cited

U.S. PATENT DOCUMENTS

| 5,462,684 A | 10/1995 | Naka et al. |
| 5,498,357 A | 3/1996 | Naka et al. |
| 6,432,889 B1 | 8/2002 | Kinoshita et al. |
| 2006/0068996 A1 | 3/2006 | Kuwabara |
| 2006/0154831 A1 | 7/2006 | Iwano |
| 2009/0003742 A1* | 1/2009 | Nakatani ............. B60B 27/0005 384/289 |
| 2009/0136170 A1* | 5/2009 | Sato et al. .................... 384/462 |

FOREIGN PATENT DOCUMENTS

| CN | 101273117 | 9/2008 |
| JP | 3-28299 | 2/1991 |
| JP | 3-282299 | 2/1991 |
| JP | 4-253796 | 9/1992 |
| JP | 5-98280 | 4/1993 |
| JP | 6-17079 | 1/1994 |
| JP | 2000-26883 | 1/2000 |
| JP | 2000-87071 | 3/2000 |
| JP | 2002-53884 | 2/2002 |
| JP | 2003-321694 | 11/2003 |
| JP | 2003-321964 | 11/2003 |
| JP | 2008-1864 | 1/2008 |
| WO | WO 2007037308 A1 * | 4/2007 |

OTHER PUBLICATIONS

International Search Report for PCT/JP2009/066762, dated Dec. 15, 2009.
Written Opinion of the International Searching Authority for PCT/JP2009/066762, dated Dec. 15, 2009.
"Sekiyu Seihin Tenkazai", (Additives for Petroleum Products), by Toshio Sakurai, Saiwai Shobo Co., (May 15, 1973), pp. 379-380.
Extended European Search Report dated Apr. 17, 2012, issued in corresponding European Application No. 09816240.7-2104.
Chinese Office Action issued for Chinese Patent Application No. 200980137695.5, dated Nov. 5, 2012.

* cited by examiner

*Primary Examiner* — Taiwo Oladapo
(74) *Attorney, Agent, or Firm* — Nixon & Vanderhye P.C.

(57) ABSTRACT

The invention provides a grease composition suitable for being packed in roll bearings to be lubricated at elevated temperatures and a bearing in which the above-mentioned grease composition is packed. In the grease composition containing a base oil, a urea-containing thickener and an additive, the additive includes an overbased metal sulfonate and the amount of the overbased metal sulfonate is 0.05 to 1.00 mass % with respect to the total amount of the grease composition. The bearing has the above-mentioned grease composition sealed therein.

5 Claims, No Drawings

GREASE COMPOSITION AND BEARING

This application is the U.S. national phase of International Application No. PCT/JP2009/066762 filed 28 Sep. 2009, which designated the U.S. and claims priority to Japan Application No. 2008-249048 filed 26 Sep. 2008, the entire contents of each of which are hereby incorporated by reference.

TECHNICAL FIELD

The present invention relates to a grease composition and a bearing where the grease composition is contained. More particularly, the present invention relates to a grease composition suitable for being packed into rolling bearings to be lubricated at high temperatures, e.g., in the automotive electric and electronic equipment directly connected with or located adjacent to engines which are running hot, in the household electrical appliances such as cleaner motors which are rotated at high speeds and elevated temperatures, and in the continuous forging facilities, and the like.

Representative examples of the automotive electric and electronic equipment include alternators, electromagnetic clutches for automobile air conditioners, idler pulleys, center pulleys, electric fan motors, hydraulic couplings, water pumps, distributors, starter one-way clutches and the like. The invention relates to a long-life grease composition that can meet the lubricating conditions of the above-mentioned equipment.

BACKGROUND ART

To obtain a grease capable of exhibiting a long life under high temperatures, oxidation inhibiting properties of the grease should be increased. For this purpose, the resistance to oxidation of the base oil, thickener, and additives has been improved in many conventional greases.

For example, various greases where the thickener comprises a diurea compound and the base oil comprises an alkyl diphenyl ether oil are proposed as a grease compositions for high-temperature and high-speed bearings, that is, for automotive electric and electronic equipment, engine auxiliary machinery and the like (as disclosed in Japanese Patent Unexamined. Publication (JP Kokai) Hei 03-028299, JP Kokai Hei 05-098280, JP Kokai Hei 06-017079, JP Kokai Hei 04-253796 and the like).

There is also proposed a grease composition aimed to reduce early seizing under conditions of high temperatures and high speeds by adding 10 mass % or more of ester oil to the base oil. The above-mentioned grease composition, however, is not necessarily provided with satisfactory performance.

There is no precedent for other additives than antioxidants being used in order to improve the oxidation inhibiting properties of the grease. The oxidation inhibiting effect of the antioxidant is inevitably determined by interaction of the antioxidant with the oil. In light of this, to demand oxidation stability means a request for the oil itself. The improvement is therefore limited so far as the kind of oil is limited. In consideration of the oxidation inhibiting mechanism, a drastic improvement in the oxidation inhibiting effect cannot be expected when the antioxidant is used alone. ("Sekiyu Seihin Tenkazai" (Additives for Petroleum Products), by Toshio SAKURAI, Saiwai Shobo Co., published May 15, 1973, pp. 379-380)

There are few novel products of base oil, thickener and antioxidant. It becomes difficult to make further improvement at the present stage.

SUMMARY OF INVENTION

Technical Problem

An object of the invention is to provide a grease composition with a long life, in particular, a grease composition suitable for being packed in rolling bearings to be lubricated at elevated temperatures, and a bearing where the above-mentioned grease composition is packed.

Solution to Problem

As mentioned above, the seizing life under severe conditions such as elevated temperatures, high speeds and the like has been extended by using a highly heat-resistant diurea compound for the thickener, employing a base oil containing a synthetic lubricating oil, and adding additives such as well-known antioxidants and the like.

The inventors of the present invention found that the generated products inclined to deteriorate by oxidation can be scavenged to inhibit the grease from hardening and allow the greases to constantly flow into the portions to be lubricated, thereby significantly extending the life of grease even under severe conditions of elevated temperatures, high speeds and the like over an extended period of time by adding a trace amount of a particular overbased metal sulfonate to a grease where a diurea compound is used for the thickener. The invention has been thus accomplished based on the above findings.

The invention provides a grease composition as shown below.

(1) A grease composition comprising a base oil, a urea-containing thickener and an additive, wherein the additive comprises an overbased metal sultanate and the amount of the overbased metal sulfonate is 0.05 to 1.00 mass % with respect to the total amount of the grease composition.

(2) The grease composition described in the above-mentioned (1), characterized in that the overbased metal sulfonate has a total base number (TBN) of 50 to 500 mgKOH/g.

(3) A bearing in which the grease composition described in the above-mentioned (1) or (2) is packed.

Advantageous Effects of Invention

According to the invention, a trace amount of a particular overbased metal sulfonate is added to a grease composition where a diurea compound is used for the thickener. As the result, the generated products inclined to deteriorate by oxidation can be scavenged to inhibit the grease from hardening and allow the greases to constantly flow into the portions to be lubricated, thereby significantly extending the life of grease even under severe conditions of elevated temperatures, high speeds and the like over an extended period of time.

DESCRIPTION OF EMBODIMENTS

Examples of the metal for overbased metal sulfonate that can be used in the invention include Ca, Na, Ba, Li, Zn, Pb, Mg and the like. Preferably, Ca, Na, Mg and the like can be used. In particular, overbased Ca sulfonates prepared by dispersing finely-divided particles of metal carbonates, metal hydroxides and the like, for example, CaCO₃, Ca(OH)₂ in the base oil are preferably used.

The overbased metal sulfonates for use in the invention are generally used as a detergent dispersant for engine oils or the like, and also commonly contained in the greases for the purpose of improvement of rust prevention, extreme pressure properties and anti-flaking properties. The amount of overbased metal sulfonate in the grease composition of the invention is extremely less than that used for the above-mentioned conventional purposes (for example, as in JP Kokai 2002-53884 and JP Kokai 2003-321694).

Until now, there is neither report nor disclosure about extension of the life of grease as a result of the use of a trace amount of overbased metal sulfonate prepared by dispersing metal carbonates and metal hydroxides such as CaCO₃, Ca(OH)₂ and the like or finely-divided particles thereof.

The amount of the overbased metal sulfonate is 0.05 to 1.00 mass %, preferably 0.08 to 0.70 mass %, and more preferably 0.10 to 0.40 mass % in the grease composition of the invention.

When the amount is less than 0.05 mass %, the effect will become insufficient. The addition of the overbased metal sulfonate in an amount of more than 1.00 mass % will accelerate the deterioration of base oil by oxidation, which will decrease the seizing life on the contrary.

As the base oil of the grease composition according to the invention any base oils including mineral oils are usable. In addition, a variety of synthetic oils, for example, synthetic ester-based oils including diesters and polyol esters; synthetic hydrocarbon oils including poly α-olefin and polybutene; synthetic ether-based oils including alkyldiphenyl ethers and polypropylene glycols; silicone oils; fluorine-containing oils and the like can be used. Those base oils can be used alone or in combination.

The urea-containing thickener used in the invention includes all the urea-based thickeners including diurea. Particularly preferable diurea thickeners may be represented by the following formula (1):

$$R^1NH\text{—}CO\text{—}NH\text{—}R^3\text{—}NH\text{—}CO\text{—}NHR^2 \quad (1)$$

wherein $R^1$ and $R^2$, which may be the same or different, represent an alkyl group having 6 to 30 carbon atoms, an aryl group having 6 or 7 carbon atoms, or cyclohexyl group; and $R^3$ is a bivalent organic group, for example, —C₆H₄—CH₂—C₆H₄—, —C₆H₄—, —C₆H₃(CH₃)— or the like.

The diurea thickener as mentioned above can be obtained by a reaction of an alkyl monoamine such as octylamine, stearylamine, dodecylamine, hexadecylamine or the like, an aryl monoamine such as aniline, p-toluidine or the like, a monoamine such as cyclohexylamine or the like with a diisocyanate such as diphenylmethane-4,4'-diisocyanate, 2,4-tolylene-diisocyanate, 2,6-tolylene-diisocyanate or the like. The most preferable thickener is a diurea compound represented by formula (1) wherein $R^1$ and $R^2$, which may be the same or different, represent an alkyl group having 6 to 30 carbon atoms or cyclohexyl group; and $R^3$ is —C₆H₄—CH₂—C₆H₄— or —C₆H₃(CH₃)—.

In the grease composition of the invention the amount of the urea thickener may be preferably in the range of 3 to 20 mass %, more preferably 4 to 15 mass %, with respect to the total amount of the grease composition.

The grease composition of the invention may further comprise general-purpose additives when necessary. Examples of those additives are as follows:
Antioxidant
Amines: phenyl α-naphthylamine, alkylated phenyl α-naphthylamine, alkylated diphenylamine and the like.

Phenols: hindered phenols such as 2,6-di-tert-butyl-p-cresol, pentaerythrityl tetrakis[3-(3,5-di-t-butyl-4-hydroxyphenyl) propionate], octadecyl-3-(3,5-di-t-butyl-4-hydroxyphenyl) propionate and the like.
Quinolines: 2,2,4-trimethyl-1,2-dihydroquinoline polymer and the like.
Rust Preventive
Carboxylic acids and derivatives thereof; alkenylsuccinic anhydride, alkenylsuccinate, half ester of alkenylsuccinate.
Carboxylates; metal (Ca, Ba, Mg, Al, Zn, Na or the like) salts of fatty acids, dibasic acids, naphthenic acid, lanolin fatty acids, alkenylsuccinic acids and the like, or amine salts thereof.
Sulfonates; Ba salt, Ca salt, Zn salt, Na salt or the like of sulfonic acid.
Passivators; sodium nitrite, sodium molybdate and the like.
Esters; sorbitan trioleate, sorbitan monoleate and the like.
Metal corrosion inhibitors; benzotriazole or derivatives thereof, zinc oxide and the like.
Extreme Pressure Agent
Phosphorus-containing compounds; tricresyl phosphate, tri-2-ethylhexyl phosphate and the like
Sulfur-containing compounds; dibenzyl disulfide, a variety of polysulfides and the like.
Sulfur-phosphorus containing compounds; triphenyl phosphorothionate
Organic metal-based extreme pressure agents; Zn, Mo, Sb, Bi salt or the like of dialkyl dithiophosphate, Zn, Mo, Sb, Ni, Cu, Bi salt or the like of dialkyl dithiocarbamate, and the like.
Others, e.g., ashless dithiocarbamate, ashless dithiophosphate carbamate and the like.
Solid Lubricant: Molybdenum Disulfide, Graphite, PTFE, MCA and the Like.

For the purpose of extension of the life, it is required to keep on charging a lubricant into a portion to be lubricated for an extended period of time. In the conventional urea-based grease compositions, however, the base oil tends to deteriorate by oxidation when exposed to severe conditions of high temperatures and high speeds over an extended period of time, and the product thus caused to deteriorate by oxidation mutually reacts with the urea-containing thickener to harden the grease composition. As a result, the grease cannot be satisfactorily charged into the lubricating portions, thereby leading to the problem of seizing.

The grease of the invention comprises a trace amount of overbased metal sulfonate, which can scavenge the generated products inclined to inclined by oxidation of urea grease, to inhibit the grease from hardening. This makes it possible to keep on charging the grease into portions to be lubricated for a long time, thereby significantly extending the life of grease.

Examples and Comparative Examples

The additive was added to a base grease as shown in Examples and Comparative Examples, and the mixture was thoroughly blended and kneaded using a three-roll mill.
Base Grease A
Thickener: aromatic diurea (i.e., a reaction product of tolylene diisocyanate with p-toluidine)
Base oil: alkyl diphenyl ether oil (Moresco Hilube LB-100, made by Matsumura Oil Research Corporation) with a worked penetration of 300

Base Grease B

Thickener: aliphatic diurea (i.e., a reaction product of diphenylmethane-4,4'-diisocyanate with octylamine)

Base oil: alkyl diphenyl ether oil (Moresco Hilube LB-100, made by Matsumura Oil Research Corporation) with a worked penetration of 300

Base Grease C

Thickener: aromatic diurea (i.e., a reaction product of tolylene diisocyanate with p-toluidine)

Base oil: poly α-olefin oil (Mobil SHE-101, made by Exxon Mobil Corporation) with a worked penetration of 300

Base Grease D

Thickener: lithium stearate

Base oil: poly α-olefin oil (Mobil SHF-101, made by Exxon Mobil Corporation) with a worked penetration of 300

To each of the above-mentioned base greases, dialkyl diphenylamine (Irganox L57, made by Ciba Specialty Chemicals) was added as an antioxidant in an amount of 3 mass % with respect to the total mass of the grease composition, and any of the following compounds was further added as the additive:

Overbased Ca sulfonate (BRYTON C-400C, made by Crompton Corporation, with a TBN of 405)

Overbased Mg sulfonate (BRYTON M-400TG, made by Crompton Corporation, with a TBN of 395)

Overbased Na sulfonate (Lubrizol 5318, made by The Lubrizol Corporation, with a TBN of 448)

Test Method for Seizing Life (ASTM D3336 mod.)

The bearing 6204 was charged with 1.8 g of a test grease, and steel plates located on both sides of the bearing were pressed. With the outer ring of the bearing maintained at 180° C., the inner ring was continuously rotated at 10,000 rpm under a load Fa (=Fr) of 67 N. The duration of time was determined until the rotational torque of the bearing became excessive to cause overcurrent of the motor (4 A) or to elevate the bearing temperature by 15° C. or more, which duration was determined to be a seizing life.

Test Results

In addition to the compositions, the test results are shown in Tables 1 and 2.

TABLE 1

| | Examples | | | | | |
|---|---|---|---|---|---|---|
| | 1 | 2 | 3 | 4 | 5 | 6 |
| Base grease | A | A | A | A | B | C |
| Overbased Ca sulfonate | 0.10 | 0.20 | | | 0.20 | 0.20 |
| Overbased Mg sulfonate | | | 0.40 | | | |
| Overbased Na sulfonate | | | | 0.15 | | |
| Test results of seizing life (hour) | 598 | 744 | 623 | 733 | 623 | 594 |

TABLE 2

| | Comparative Examples | | | | | |
|---|---|---|---|---|---|---|
| | 1 | 2 | 3 | 4 | 5 | 6 |
| Base grease | A | A | A | B | C | D |
| Overbased Ca sulfonate | | 0.02 | 5.00 | | | 0.20 |
| Test results of seizing life (hour) | 298 | 210 | 200 | 180 | 230 | 20 |

The grease compositions according to the invention as shown in Examples 1 to 6, each comprising the urea compound as the thickener and a trace amount of overbased metal sulfonate can exhibit significantly longer seizing life when compared with the grease compositions (of Comparative Examples 1, 4 and 5) containing no overbased metal sulfonate.

The effect by the addition of overbased metal sulfonate becomes conspicuous in the urea-based grease compositions. To be more specific, no effect of the additive was observed in Comparative Example 6 where the thickener employed in Example 2 was replaced by a lithium soap.

It is also confirmed that the effect of extending the seizing life cannot be exhibited when the amount of overbased metal sulfonate is 0.02 mass % as in Comparative Example 2 and 5.00 mass % as in Comparative Example 3.

The invention claimed is:

1. A grease composition for bearing comprising a base oil, a urea-containing thickener and a seizing life extending additive, wherein
   the base oil is alkyldiphenyl ether,
   the urea-containing thickener is represented by the following formula (1):

$$R^1NH-CO-NH-R^3-NH-CO-NHR^2 \qquad (1)$$

wherein $R^1$ and $R^2$, which may be the same or different, represent an aryl group having 6 or 7 carbon atoms, and $R^3$ is
   $-C_6H_4-CH_2-C_6H_4-$, $-C_6H_4-$, or $C_6H_3(CH_3)-$,
   wherein the seizing life extending additive extends seizing life of the grease composition and comprises an overbased Ca or Na sulfonate,
   wherein an amount of the base oil is 79.6 mass % or more with respect to the total amount of the grease composition,
   wherein an amount of the urea-containing thickener is 19 to 20 mass % with respect to the total amount of the grease composition and
   wherein an amount of the overbased Ca or Na sulfonate is 0.1 to 0.4 mass % with respect to the total amount of the grease composition.

2. The grease composition for bearing of claim 1, wherein the overbased metal sulfonate has a total base number (TBN) of 50 to 500 mgKOH/g.

3. A bearing comprising the grease composition for bearing of claim 1 therein.

4. A bearing comprising the grease composition for bearing of claim 2 therein.

5. The grease composition for bearing of claim 1, further comprising antioxidants having at least one functional group selected from amine functional groups, phenol functional groups and quinolone functional groups.

* * * * *